United States Patent [19]
Sulway

[11] Patent Number: 5,158,461
[45] Date of Patent: Oct. 27, 1992

[54] TEACHING AID

[76] Inventor: Martyn J. Sulway, 40 Shirley Road, Wollstonecraft, New South Wales, Australia, 2065

[21] Appl. No.: 657,776

[22] Filed: Feb. 20, 1991

[30] Foreign Application Priority Data

Feb. 20, 1990 [AU] Australia .................. PJ8271

[51] Int. Cl.$^5$ .............................................. G09B 23/30
[52] U.S. Cl. ...................................................... 434/268
[58] Field of Search .............. 434/258, 262, 267, 268, 434/272, 279, 296, 297, 274, 276–278, 280, 281

[56] References Cited

U.S. PATENT DOCUMENTS

| | | | |
|---|---|---|---|
| B 546,097 | 3/1976 | Gonzalez | 434/272 |
| 3,376,659 | 4/1968 | Asin et al. | 434/272 |
| 3,748,366 | 7/1973 | Rader et al. | 434/272 |
| 4,938,696 | 7/1990 | Foster et al. | 434/267 |

Primary Examiner—Richard J. Apley
Assistant Examiner—Glenn E. Richman
Attorney, Agent, or Firm—Fleit, Jacobson, Cohn, Price, Holman & Stern

[57] ABSTRACT

A teaching aid for use in explaining the biochemical and/or physiological basis of human body function in health or when suffering from a pathological condition such as diabetes mellitus. The teaching aid comprises means representing the blood stream, organs and cells and a plurality of sets of tokens representing chemical or biochemical substances. The blood stream is represented as substantially linear. The organs and cells are represented as substantially the same size and are positioned in direct communication with the blood stream representing means. The tokens are moved along the blood streams representing means and into and out of the organ and cell representing means to demonstrate the functions of the organs and cells.

13 Claims, 6 Drawing Sheets

TEACHING AID

FIELD OF THE INVENTION

This invention relates to apparatus for use as a teaching aid. The apparatus is of particular value in explaining the biochemical and/or physiological basis of human body function in health or when suffering from a pathological condition and the mode of action of an antagonist or therapeutic for that condition in an interactive manner. It is also of assistance for example in demonstrating management of certain diseases.

BACKGROUND ART

The invention is herein described with particular reference to apparatus for use in teaching the basis and management of diabetes mellitus but is not limited to that use.

It is desirable for patients with diabetes, and their support relatives and friends, to learn information about their bodies in health as well as after diabetes is diagnosed with a view to their understanding:

(a) how to minimise or prevent the acute and long-term body damage caused by diabetes mellitus when poorly controlled;

(b) how to treat and prevent complications of the treatment itself such as hypoglycemia;

(c) how to identify internal and external risk factors in their lives which may contribute to problems of disease management.

Hitherto, diabetes education has been conducted by means of lecture or explanation assisted by reference to printed literature, slides, videos, charts and posters, sometimes assisted by use of white or blackboards and the like. It has also been practiced to refer to realistic and anatomically correct scale models of the body having removeable organs.

The prior art teaching aids suffer from a number of disadvantages. "Talk and chalk" methods and those referring to illustrative diagrams are not effective to convey dynamic interactions between various chemical and biochemical substances (including nutrients, hormones, metabolites, antigens, immunogens, microorganisms, parasites etc.) on the one hand and various organs or cells on the other. In addition, known teaching aids do not readily arrest attention, especially of children, for a sufficiently long span of time. Anatomically exact models suffer from the additional disadvantages that many individuals have little knowledge of their anatomy and find it difficult to relates to such complex models. Moreover, such models are of little assistance in explaining relevant biochemical and/or physiological processes or the function of the organs.

An object of the present invention is to provide a teaching aid which avoids or at least ameliorates the above discussed disadvantages of the prior art.

DISCLOSURE OF THE INVENTION

The present invention consists in a teaching aid for use in explaining the biochemical and/or physiological basis of human body function in health or when suffering from a pathological condition and the mode of action of an antagonist or therapeutic for that condition, comprising:

(a) a substantially linear blood stream representation means;

(b) at least one organ representation means;

(c) at least one cell representation means;

(d) a plurality of sets of chemical or biochemical substance representation means, the organ representation means and the cell representation means being positioned in direct communication with the blood stream representation means and the chemical or biochemical substance representation means being capable of being moved manually along the blood stream representation means and of entering the organ representation means and/or the cell representation means.

The teaching aid according to the present invention is particularly distinguished from prior art teaching aids of the present type. Firstly the blood stream is invariably depicted as a loop with one half of the loop representing arterial blood flow and the other venous blood flow. The present inventor has found that abandoning a true-to-life blood stream representing means in favour of a linear, i.e. single line bidirectional, blood flow representation means dramatically simplifies the teaching aid and makes it much easier to understand for those being taught. Secondly, the teaching aid incorporates both organ representation means and cell representation means directly communicating with the blood stream representation means and both being, preferably, of substantially the same size. Again this differs significantly from the real life situation and yet is has been found by the present inventor to simplify the teaching aid and to make it easier to understand.

In preferred embodiments of the invention, one set of chemical or biochemical substance representation means, hereinafter called tokens, is distinguished from another by shape, colour, size, indicia, or a combination of those distinguishing features. The biochemical substance represented by a set of tokens may be a nutrient (such as a protein, carbohydrate, fat, fibre), fuel, hormone, metabolite, antigen, immunogen, specific molecules or class of molecules, microorganisms, parasites or the like. Chemical substances represented by tokens may be for example oxygen or another element.

Some of the tokens may have a first face representing one substance when the first face is uppermost but may represent another substance, preferably a related substance such as a metabolite of the first invention when the obverse face is uppermost.

The substantially linear blood stream representation means is preferably a channel along which the tokens may be moved in either direction. In another embodiment of the invention the blood stream representation means may be a printed indicia on a board. The blood stream representation may be straight or curved, and, if desired, branched. It is however linear in the sense that the blood stream is represented in flowing along a single line to and from any individual organ or cell and not in a circulatory manner.

A day/night time representation means may be used as an adjunct to the blood stream representation means. The day/night time representation means may take the form of an insert or overlay having a first face representing day time and an obverse face representing night time. The tokens may be placed along the time representation means to indicate the presence of the chemical or biochemical substance represented by the token in the blood stream at a particular time. The relative quantity of tokens or the position of a token on the day/night time representation means may be used to indicate relative amounts of chemical or biochemical substances present in the blood stream at a particular time. The day/night time representation means may be used to demonstrate the competing influences leading to the increase and decrease of, e.g., blood sugar levels. Blood sugar levels may increase because of ingestion of food, diurnal fluctuations in liver functions and the generation of hormones mediating for release of sugar from the liver due to stress, exercise or other environmental factors. Blood sugar levels may decrease as a result of utilisation of blood sugars due to exercise in the presence of insulin. The day/night time representation means may also be used to illustrate the change over time of a physiological measurement such as respiratory peak flow rate.

The organ representation means may represent any bodily organ. A particular strength of the teaching aid according to the present invention is that only those organs of the body relevant to the particular point being explained need be used at any one time. The teaching aid will normally include a head and brain representing means, a liver representing means, a gut representing means, a pancreas representing means, and a kidney representing means. It could, however, include in addition to or instead of one or more of the above organ representing means representing the heart, the lung, the male or female genitalia bone, a gravid uterus, a leg with blood supply and nerve supply, an arm with blood supply and an eye.

The cell representation means may represent any of the cells of the body either in a microscopic form or in a macroscopic form as a tissue. Preferably the teaching aid will include means representing muscle cells and fat cells. It may, however, also include other cell types, particularly cells which are not insulin dependent.

The organ representation means and cell representation means may have a first face representing one organ or cell when the first face is uppermost but may represent another organ or cell when the obverse face is uppermost.

The organ representing means and the cell representing means are positionable into direct communication with the blood stream representation means. This may be done by merely placing the organ or cell representing means on a supporting surface in contact with the blood stream representation means or there may be interengageable tabs, or other like means, on the teaching aid securing the blood stream representation means and the organ or cell representation means together.

In a particularly preferred embodiment of the invention one or more of the organ representation means or the cell representation means includes a gate which may be opened or closed to permit or prevent the movement of tokens to or from the organ or cell representation means. In an even more preferred embodiment of the invention the gate may be opened by the mechanical interaction of a token representing a particular chemical or biochemical substance with the gate. In one embodiment the gate is a pivoted lever which has an array of teeth arranged around the pivot point in the manner of a pinion wheel which cooperate with corresponding teeth arranged in a linear array along one edge of the token in the manner of a rack. Sliding the token into a slot adjacent the gate will cause the gate to rotate from a closed to an open position allowing the ingress of tokens previously excluded.

It will be understood that the models of organs, cells, circulatory system, etc. herein described need bear no resemblance to the appearance of such organs or cells in reality but rather are desirably designed to operate in a manner analogous to a function of the cell or organ in health or in disease.

The invention enables one or a group of participants to become interactively involved in movement of tokens around the apparatus and in the operation of the various "organ" or "cell" model mechanisms in a way which is not feasible with prior art teaching aids and which rapidly increases the participant's understanding of cause and effect and of dynamic inter-relationships between the parts. The apparatus may be used as a game board and, with the addition of real-life props such as foodstuffs, cigarettes, alcohol, glucagon kits, jogging shoes, a blood glucose monitoring machine and strips, urine testing reagent strips and the like, may be used to explain diagnostic procedures. These real-life props establish in the minds of the participants the link between external reality and the internal working of their bodies. Other advantages of the apparatus will become apparent from the more detailed description which follows.

BRIEF DESCRIPTION OF THE FIGURES

The invention will now be more particularly described by way of example only with reference to the accompanying schematic drawings wherein:

Referring to FIG. 1, the teaching aid comprises a substantially linear blood stream representation means (hereinafter referred to as "blood stream means") generally indicated by the reference numeral 1, having a central branched stem (11) and a plurality of openings (12-19). A day/night time representation means (90) takes the form of a bridge over the blood stream means. Liver (30), gut (40), pancreas (50) and kidney/adrenal gland (60) representation means are positioned in direct communication with the blood stream means at the openings as shown (12, 13, 14, 17 respectively).

Figure 1:
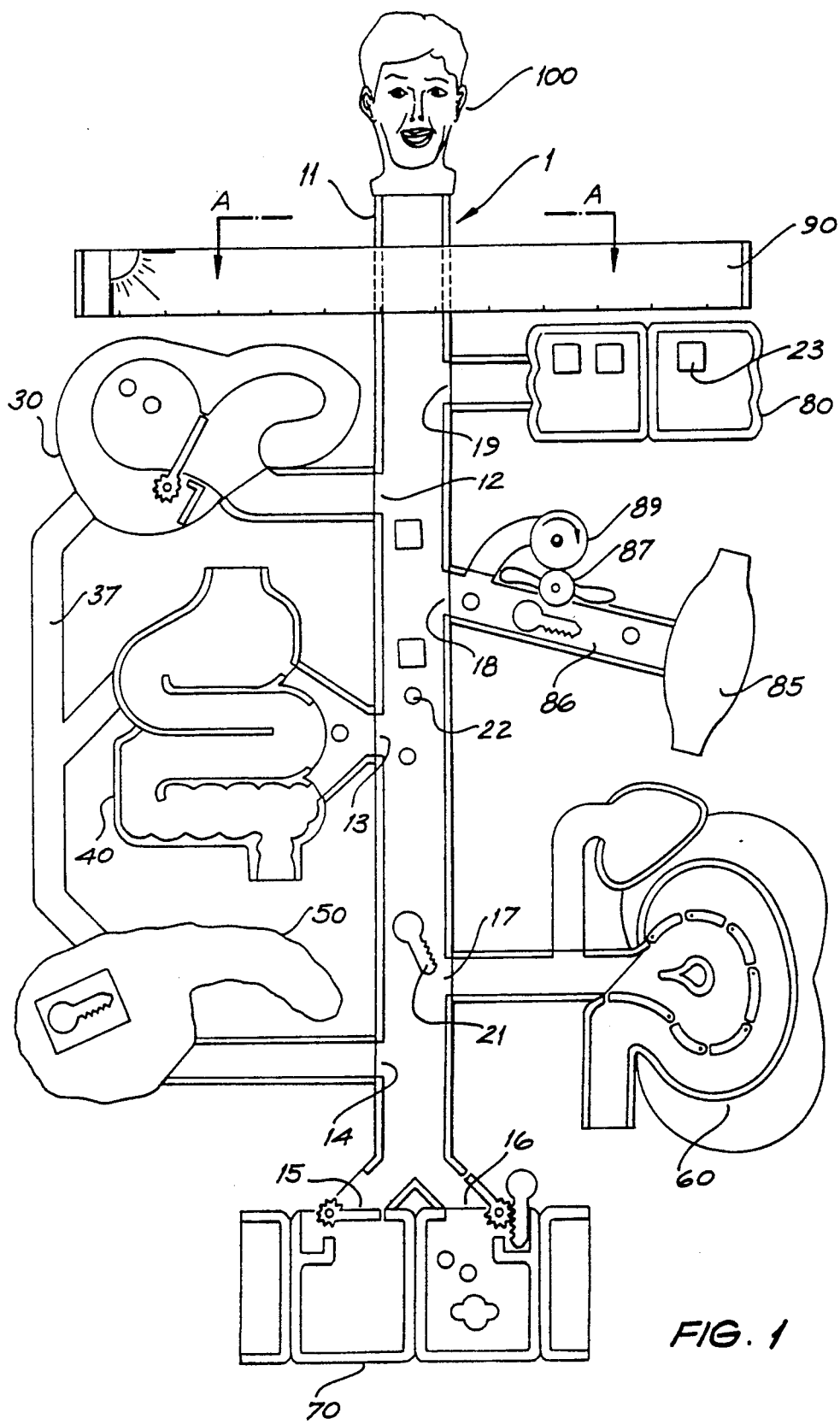
FIG. 1 is a schematic diagram showing a teaching aid according to the invention in plan view.

Cell representation means (70,80,85) are positioned in direct communication with the blood stream means at other openings as shown (15, 16, 18, 19 respectively). A plurality of body cells is represented at the microscopic level by means shown by reference numeral 70. Muscle cells are represented for example, or cells which are not insulin dependent, such as liver cells. Fat cells are represented by means indicated by reference numeral 80. The obverse face (not shown) represents fatty tissue and carries a representation of a syringe being used to inject insulin into the subcutaneous fatty tissue of a body. Body cells are represented at the macroscopic level by means shown by reference numeral 85. A pathway (86) to the cell representation means (85) is fitted with a paddle wheel (87) pivotably mounted about its centre. This paddle-wheel (87) is used to represent the increased sensitivity of cells to insulin during and after exercise. The paddle wheel (87) is driven by an exercise wheel (89) which may be rotated to indicate the subject engaging in exercise.

A schematic head (100) is located at the top of the blood stream means, one surface depicting a happy face and on the opposing surface, a sad face. The face is removable to reveal representation of the brain and the carotid artery system.

A plurality of sets of tokens are present. One set comprises a plurality of key shaped tokens (21), representing insulin molecules. Another set comprises disc shaped tokens (22) representing glucose molecules. A third set comprises square shaped tokens (23) representing fatty acid molecules. In the present example, one face of the square tokens (23) is yellow and the obverse face is of a different colour and represent ketone molecules. Desirably, the ketone side is of a similar colour to that of an indicator test strip giving a positive ketone reaction. The tokens of one set can be distinguished from another by colour, shape, size, indicia, or a combination of those features. Other sets of tokens (not illustrated) can represent red blood cells, white blood cells, specific hormones, immunogens, microorganisms, parasites and so on. The key shaped tokens are shaped so as to cooperate with gates on the organ representation means or cell representation means as is described below.

Figure 2:
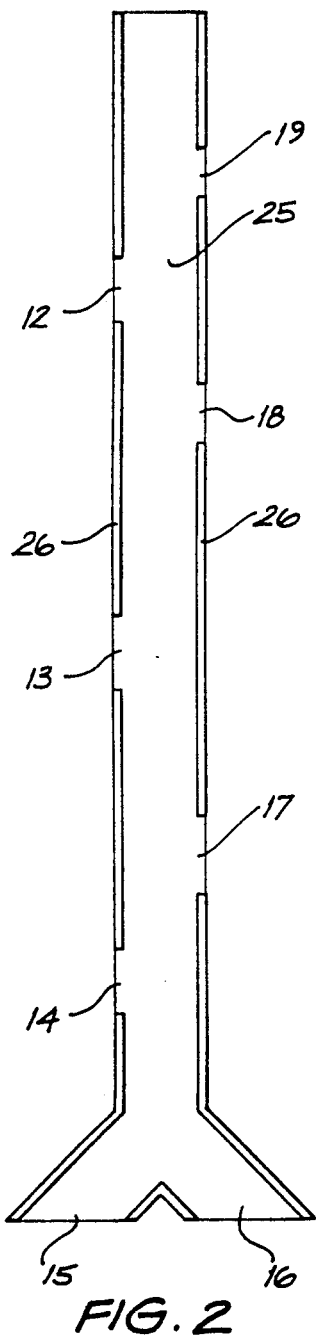
FIG. 2 shows blood stream representation means of FIG. 1 in more detail in plan view.
Figure 3:
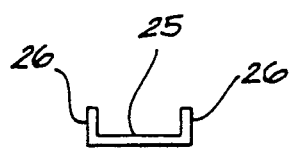
FIG. 3 is an end elevation of the blood stream representation means of FIG. 2.
Figure 4:
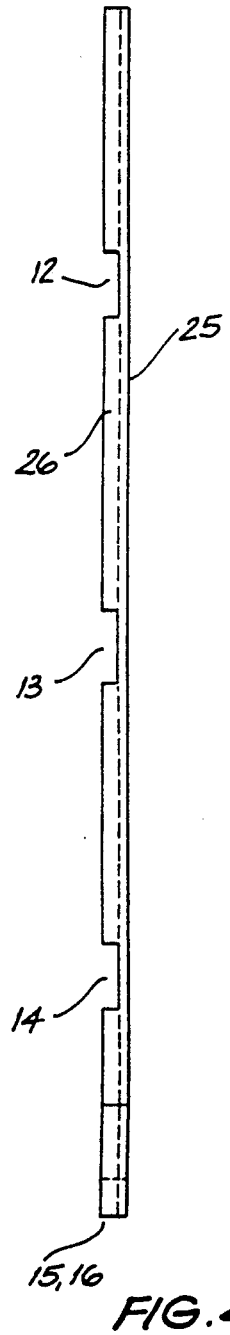
FIG. 4 is a side elevation of the blood stream representation means of FIG. 2.

The blood stream means is further illustrated in FIGS. 2, 3 and 4. The central branched stem has a flat base (25) and raised side walls (26) with openings therein (12-19). In a preferred embodiment the blood stream means are red in colour. The blood stream means act as a channel for movement of the tokens from one organ or cell representation means to another. The tokens may be moved along the blood stream means by hand or by the use of a croupier's rake or the like. Raised side walls keep the tokens within the blood stream means.

Figure 5:
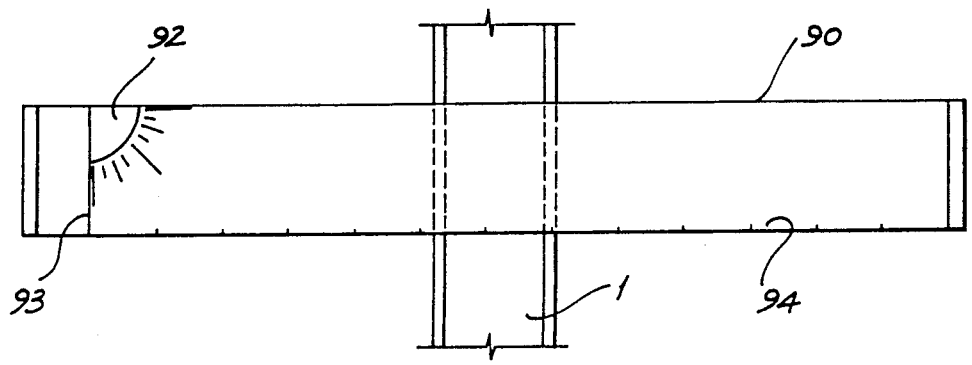
FIG. 5 shows day/night time representation means in plan view.
Figure 6:
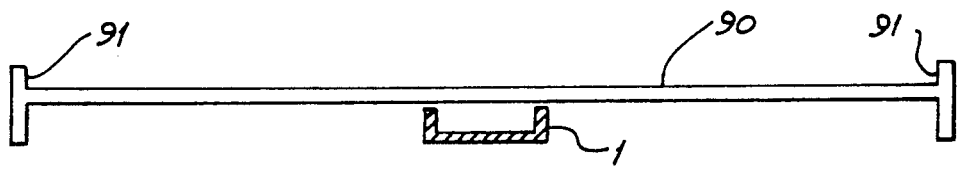
FIG. 6 is a sectional view along A—A of FIG. 1 showing the day/night representation means.

The day/night time representation means is shown in FIGS. 5 and 6 taking the form of a bridge over the blood stream means (1). The day/night representation means is substantially linear with raised supports (91) at either end and may be moved transversely across the blood stream means to indicate the passage of time. A first face (shown) has indicia representing day (92), a vertical scale representing relative quantity (93) and horizontal scale (94) representing time of day. A second obverse face (not shown) has indicia representing night and a similar scale representing relative quantity vs. time. The tokens are placed along the horizontal axis to indicate presence of the chemical or biochemical substance represented by that token in the blood stream at a particular time, the relative height on the vertical scale indicating relative amounts of that substance in the blood stream.

Figure 7:
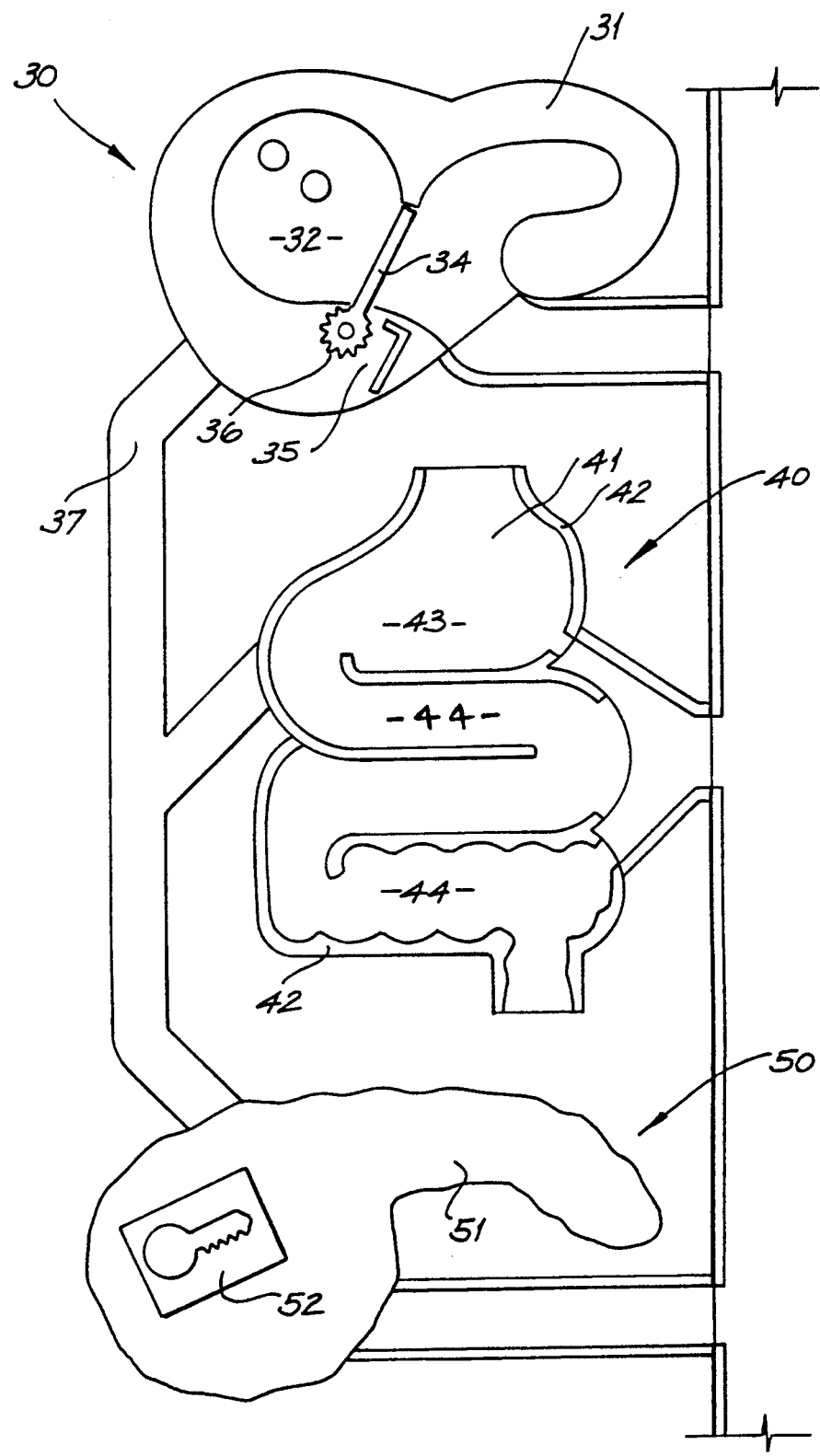
FIG. 7 shows that part of the teaching aid of FIG. 1 representing the liver, intestine and pancreas in communication with the blood stream in plan view.

Referring now to FIG. 7 the liver representation means (30) comprises a base (31) upon which is defined an area (32) in which tokens representing glucose are placed to represent glucose production from other metabolites. A pivoted lever (34) is pivotally mounted adjacent to a socket (35). The pivoted lever has an array of teeth (36) which correspond to teeth of key shaped tokens representing glucagon. When a glucagon representing key shaped token is inserted into the socket, the teeth cooperate with those of the lever causing the lever to pivot from a closed to an open position. A pathway (37) represents connection between the liver and intestine and the pancreas and intestine for release of bile and enzymes respectively into the intestine.

The gut representation means (40) comprises a base (41) and raised edges (42), the upper portion (43) representing the stomach and the lower portion (44) representing the intestine.

The pancreas representation means (50) comprises a base (51) upon which is defined, e.g. by painting, an area (52) for storage of "insulin" tokens.

Figure 8:
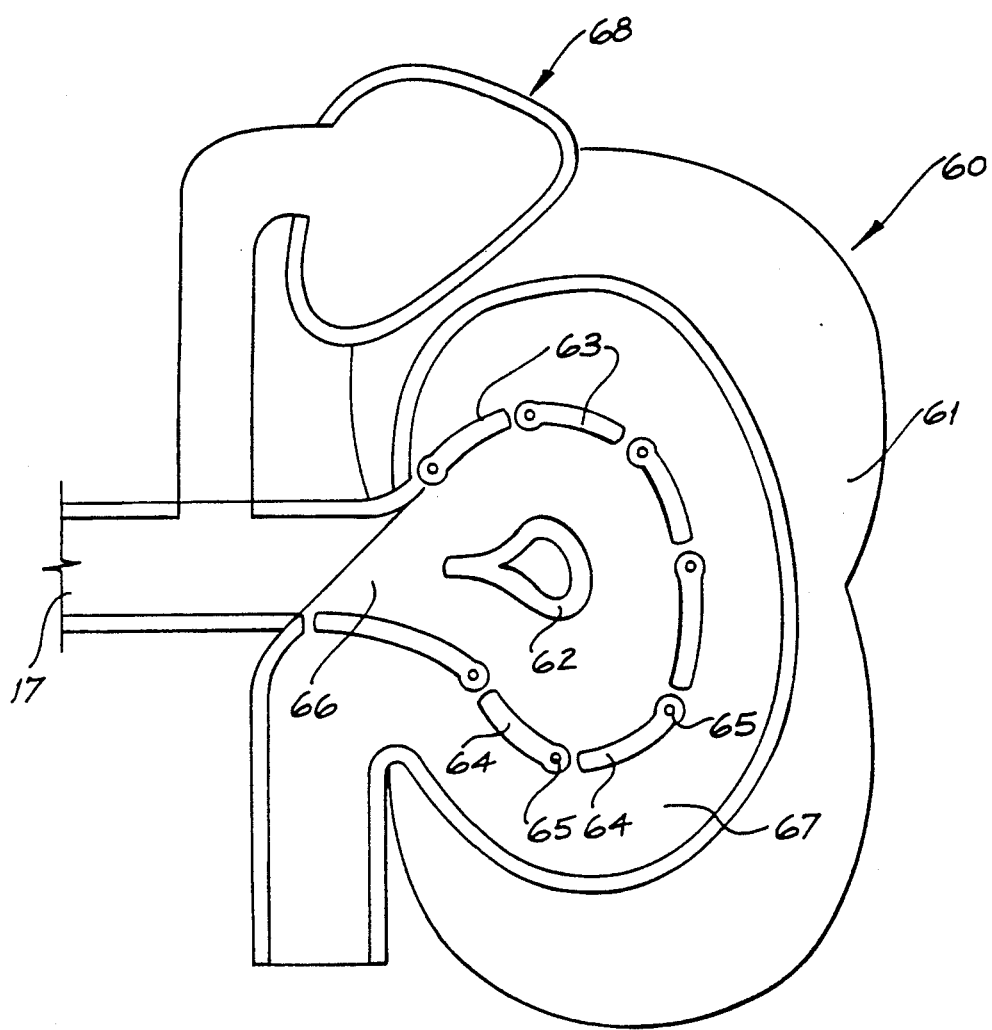
FIG. 8 shows that part of the teaching aid of FIG. 1 representing the kidney and adrenal gland in plan view.
Figure 9:
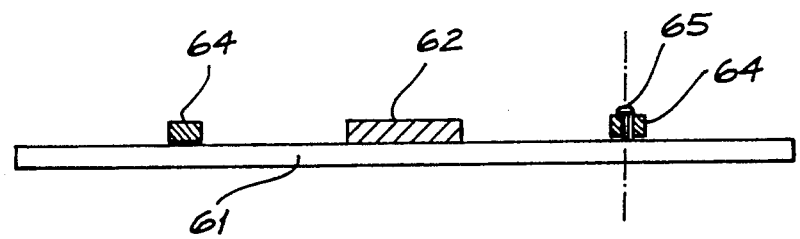
FIG. 9 shows a side elevation of the kidney representation means of FIG. 8.

With reference to FIGS. 8 and 9 there is shown kidney representation means (60) comprising a base board (61), a raised centre wall (62) and a plurality of gates (63) each consisting of an arcuate member (64) pivotally mounted to the base by a pivot pin (65). The gate members (64) together with the central wall (62) define a track (66) which extends from the blood streams means opening (17) and which loops back to the opening when gates (63) are in their "closed" position in which members (64) are disposed head to tail about a circle. Members (64) may be pivotally "opened" and in that disposition at least some tokens, such as those representing glucose molecules (22) which enter track (66) from opening (17) may exit from track (66) to track (67) via gates (63). One set of tokens (not illustrated) is provided with arcuate slots corresponding to members (64) whereby the tokens are to be fitted over gate members (64) enlarging them and thus reducing the passageway available when the gates are open. The latter tokens are applied progressively to represent fibrosis and kidney damage which results in filtration deficiency. Means representing the adrenal gland (68) are positioned adjacent the kidney representation means.

Figure 10:
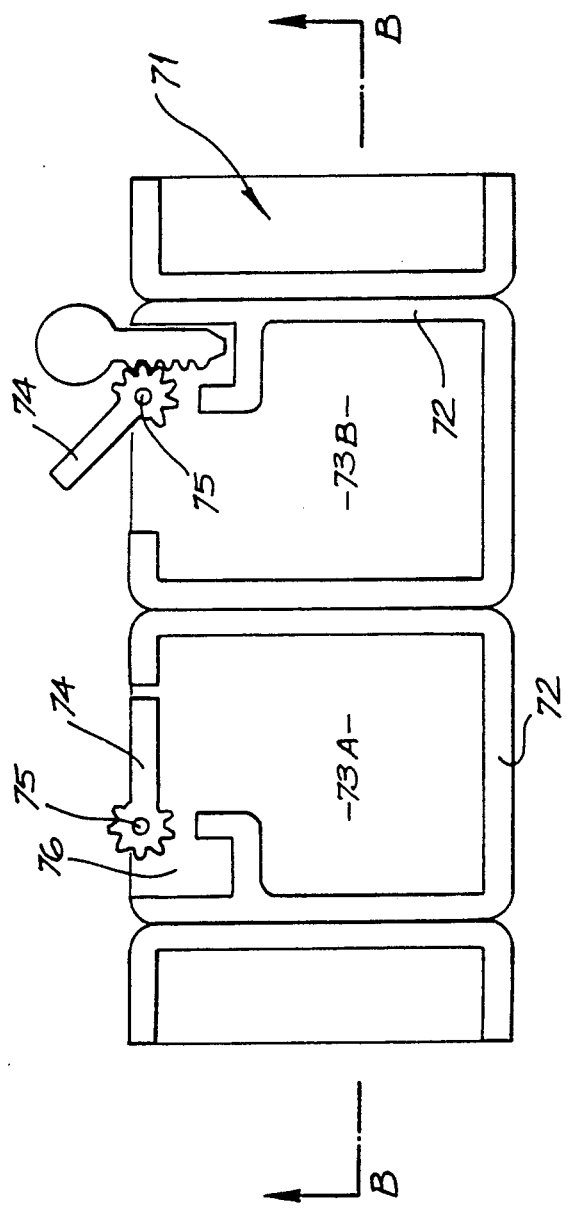
FIG. 10 shows that part of the teaching aid of FIG. 1 representing cells in plan view.
Figure 11:
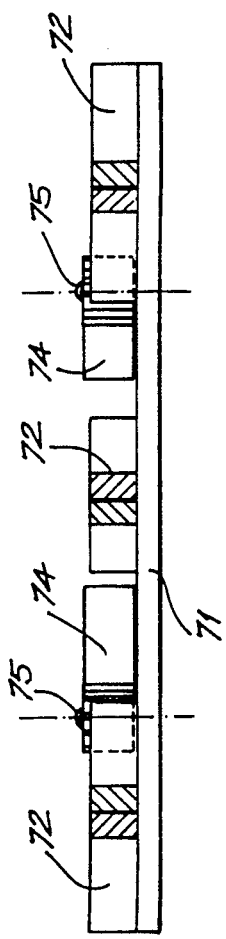
FIG. 11 shows a cross-section along line B—B of FIG. 10.

With reference to FIGS. 10 and 11 there are shown means representing a plurality of body cells at a microscopic level. The means comprise a base board (71) and raised "cell walls" (72) defining two cell interiors (73A, 73B). Each cell has a pivoted lever (74) mounted to base (71) adjacent a socket (76), similar to the arrangement described above in connection with the liver representation means. In the schematic illustration of FIG. 10 the lever (74) of cell (73A) is shown in a closed position while socket (76) of cell (73B) is shown with a token representing an insulin molecule (21) inserted in the socket and with lever (74) in an open position. In a preferred embodiment (not illustrated), inlays are provided with formations which are interengageable with corresponding formations of "cell walls" (72) to demonstrate membrane thickening or other tissue damage.

An example of use of the teaching aid will now be described with reference to the drawings and particularly FIG. 1.

In use of the teaching aid to demonstrate the metabolism of glucose in a healthy body, a sugar containing foodstuff is passed through the gut representation means (40) in consequence of which round "glucose" tokens (22) may be passed via an opening (13) into the blood stream means.

Because the body is healthy in the example under consideration, in response to glucose in the circulatory system the pancreas generates insulin and that can be indicated by movement of key shaped "insulin" tokens (21) from a pile stored at storage area (52) or pancreas representation means (50) to blood stream means (1) via opening (14). An "insulin" token (21) reaching cell representation means (70) may be inserted in "insulin receptor" socket (76) thereby moving the lever (74) to an open position as shown in FIG. 10. The "glucose" tokens may be moved along the stem (11) of the blood stream means (1) towards cell representation means (70). Because the lever (74) is open, the "glucose" tokens (22) can enter the interior (73B) of the cell representation means (70).

In demonstrating the effect of a pancreas which does not produce insulin, both levers (74) of cell representation means (70) remain closed as shown on the left side of FIG. 10 because no "insulin" token (21) has mated with cell "insulin receptor" sockets (76). Consequently, "glucose" tokens (22) fed into the blood stream means are denied access to cell interiors (73A and 73B) and accumulate in the blood stream means. Some of the accumulating "glucose" tokens may be moved through opening (17) to the kidney representation means (60).

The "glucose" tokens (22) are slidable along path (66) of the kidney representation means. If the glucose level in the kidney representation means is normal then the "glucose" tokens return via path (66) to the blood stream means. If the concentration is excessive then gates (64) move arcuately about pivots (65) allowing some of the "glucose" tokens to pass out to track (67).

If desired, a shape representing a urine collector or chamber pot (not illustrated) may be provided to receive the exiting tokens representing glucose molecules. A model of a urine test strip (not illustrated) may be provided to show the appearance of an indicator test strip under such conditions. One side of the test strip model shows the colours of a strong positive reaction for both ketone and sugar, while the other shows a strong negative reaction.

In practice, students are involved under the guidance of a teacher in moving the tokens, manipulating the organ or cell models and making decisions about the likely consequences of various occurrences.

Users of the teaching aid may be introduced to the concept of the blood sugar level rising and falling due to diurnal fluctuations, insulin supply, ingestion of food, stress, exercise and the like. The day/night time representation means is placed across the blood stream means. At points on the horizontal scale representing times of the day when food is ingested "glucose" tokens are placed high on the vertical scale. "Glucose" tokens are placed lower on the vertical scale at points on the horizontal scale representing times of the day when glucose is being used up by the cells. A wavy line of "glucose" tokens thereby develops. Stress or exercise generates hormones that cause release of glucose from the liver into the blood stream. At points on the horizontal scale representing such times, "glucose" tokens are moved up the vertical scale. The level of glucose in the blood stream is reduced by consumption in the cells, which in many cells takes place only in the presence of insulin. The roles of short and long acting insulin may be introduced and the importance of the relative timing of insulin injections, ingestion of food and exercise may be demonstrated.

The effect of exercise may be introduced through the use of exercise wheel (89). Rotation of the exercise wheel (89) is used to represent the user engaging in physical exercise. This rotation causes rotation of the paddle wheel (87) which represents the increased sensitivity of insulin receptors on the cells during and for a period after exercise.

At rest "insulin" key shaped tokens approach muscle or fat cell representation means (85) and by opening gate 74 permits the entry of "glucose" tokens into the cell. During and for a period after exercise the sensitivity of the insulin receptors is increased and this is represented by the paddle wheel (87) urging the insulin tokens towards the cell.

Many other interrelationships may be demonstrated by use of the model and applying the same or similar principles. Thus, complex concepts such as ketogenisis, kidney filtration of blood components, or the influence of obesity on insulin receptor sensitivity can be graphically demonstrated with the apparatus in a way that makes those concepts easily understood by persons aged 10 years or older.

The various organ and cell representation means may be attached to blood stream means by interlocking engagement in the manner of jigsaw parts, by "velcro" or other fasteners or the models may merely be located at a side arm end. Other organ and cell representation means may be added or removed as desired. Preferably, only those representation means and tokens relevant to explain a particular topic or relationship are used, the others being removed to avoid distraction. The teaching aid may easily be adapted for students of different ages, language and culture, attention spans and educational sophistication.

Models representing other organs or body parts for example male or female reproductive organs, lung, brain, eye, muscle, bone and the like which have not been described herein can be employed in an analogous manner. Other interactions may include the attachment of tokens to organ or tissue parts or parts of the circulatory system track to illustrate for example "thickening" of arteries or cell walls or the detachment of parts to illustrate removal of tissue, for example of nerve myelin sheath in response to glucose molecules under certain conditions.

If desired, special tokens may be used to cover the insulin receptors (76) of cell representation means (70) enabling the cell model to represent e.g. eye or liver cells which do not require insulin to permit the entry of glucose.

The apparatus of the invention is advantageously used with supplementary props including items such as foodstuffs, cigarettes, glucagon kit, blood glucose monitoring machine and strips, urine testing reagent strips, insulin bottles, insulin pens and syringes, oral anti-diabetic tablets, sphygmomanometer, stethoscope, etc.

It will be appreciated that although the blood stream representation of the preferred embodiment is desirably a channel or gutter, it could equally be a path defined as a printed shape on a game board or on a floormat or the like. The apparatus herein described can be scaled down to a desk-top size for counselling individuals, but the embodiment illustrated is of a scale adapted for use on a carpet with for example 30 participants involved in moving the parts. The apparatus of the invention has eye appeal and involves participants in the manipulation of the "chemical" and "biochemical" tokens and the way in which the tokens interact with the various cells and organs in a dynamic, participatory, and visually arresting manner.

The apparatus may also be used as a game, random means such as a shuffled pack of cards being used to issue instructions to establish certain biochemical conditions or to release certain quantities of specified biochemical substances into the system and players in turn having to specify satisfactory counter measures.

A particular advantage of the teaching aid according to the present invention is that it allows the teaching of complex ideas at a rate which is tied to the speed of comprehension of those being taught. This contrasts with prior art films, tapes and the like where the speed of presentation of ideas cannot be varied.

Although the invention has been described with particular reference to an aid for explanations relating to diabetes, it is adaptable for use in other situations for example in explanation of dietary effects.

From the foregoing description, it should be apparent that the invention encompasses an advantageous advance in the art or at least a commercial alternative to the prior art. Further, it should be apparent that the invention may be embodied in other specific forms without departing from the spirit or the essential characteristics thereof. The present embodiments are therefore to be considered in all respects as illustrative and not restrictive.

I claim:

1. A teaching aid for use in explaining the biochemical and/or physiological basis of human body function in health or when suffering from a pathological condition and the mode of action of an antagonist or therapeutic for that pathological condition, comprising:
   (a) a substantially linear blood stream representation means;
   (b) at least one organ representation means;
   (c) at least one cell representation means;
   (d) a plurality of sets of chemical or biochemical substance representation means,
the organ representation means and the cell representation means being positioned in direct communication with the blood stream representation means and the chemical or biochemical substance representation means being capable of being moved manually along the blood stream representation means and of entering the organ representation means and/or the cell representation means.

2. A teaching kit as claimed in claim 1 in which at least one of the organ representation means or one of the cell representation means includes a gate which may be opened or closed to permit one or more of the chemical or biochemical substance representation means to be moved into or out of the organ or cell representation means.

3. A teaching aid as claimed in claim 2 in which the gate may be opened by the mechanical interaction of a representation means representing a particular chemical or biochemical substance.

4. A teaching aid as claimed in claim 3 in which the gate is a pivoted lever which has an array of teeth arranged around the pivot point in the manner of a pinion and the token has a linear array of complimentary teeth along one edge in the manner of a rack such that insertion of the token into a slot adjacent the gate will cause the gate to rotate from a closed to an open position.

5. A teaching aid as claimed in claim 1 comprising a substantially linear day/night time representation means as an adjunct to the blood stream representation means.

6. A teaching aid as claimed in claim 5 in which the day/night time representation means extends transversely of the blood stream representation means and may be moved across the same, having indicia thereon representing times of the day and night and a scale representing the relative levels in the blood of chemical or biochemical substances or physiological measurements.

7. A teaching aid as claimed in claim 1 in which a physical exercise representation means is included that increases the speed at which the chemical or biochemical substance representation means are moved into or out of the organ or cell representation means.

8. A teaching aid as claimed in claim 7 in which the physical exercise representation means comprises a paddle wheel pivotally mounted about its centre adjacent to organ or cell representation means.

9. A teaching aid as claimed in claim 1 in which the organ representation means is selected from means representing the kidney/adrenal gland, the gut, the pancreas and the liver.

10. A teaching aid as claimed in claim 9 in which the teaching aid also includes an organ representation means representing the head, the heart, the lung, an arm, a leg, the genitalia, the uterus or the eye.

11. A teaching aid as claimed in claim 1 in which the teaching aid includes cell representation means representing muscle cells and fat cells.

12. A teaching aid as claimed in claim 11 in which the teaching aid also includes cell representation means representing a class of non-insulin dependent cells.

13. A teaching aid as claimed in claim 1 in which at least one of the chemical or biochemical substance representation means is in the form of a flat token bearing on one side an indicia representing one chemical or biochemical substance and on the other side another related chemical or biochemical substance.

* * * * *